(12) United States Patent
Sorrentino et al.

(10) Patent No.: US 9,736,828 B2
(45) Date of Patent: Aug. 15, 2017

(54) NETWORK NODE AND A METHOD THEREIN FOR SCHEDULING A DOWNLINK DATA TRANSMISSION TO A UE, AND A UE AND A METHOD THEREIN FOR RECEIVING A DOWNLINK DATA TRANSMISSION

(75) Inventors: Stefano Sorrentino, Solna (SE); David Hammarwall, Vallentuna (SE); George Jöngren, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 127 days.

(21) Appl. No.: 14/413,870

(22) PCT Filed: Jul. 17, 2012

(86) PCT No.: PCT/SE2012/050840
§ 371 (c)(1),
(2), (4) Date: Jan. 9, 2015

(87) PCT Pub. No.: WO2014/014394
PCT Pub. Date: Jan. 23, 2014

(65) Prior Publication Data
US 2015/0181570 A1 Jun. 25, 2015

(51) Int. Cl.
*H04W 72/04* (2009.01)
*H04W 72/12* (2009.01)
*H04L 5/00* (2006.01)
*H04W 76/04* (2009.01)

(52) U.S. Cl.
CPC ......... *H04W 72/042* (2013.01); *H04L 5/0057* (2013.01); *H04W 72/048* (2013.01); *H04W 72/1205* (2013.01); *H04W 76/046* (2013.01)

(58) Field of Classification Search
CPC ...... H04W 72/04; H04W 88/08; H04W 76/00
See application file for complete search history.

(56) References Cited

U.S. PATENT DOCUMENTS

| | | | |
|---|---|---|---|
| 2007/0040703 A1 | 2/2007 | Akkarakaran et al. | |
| 2010/0311426 A1 | 12/2010 | Muller | |
| 2011/0149903 A1* | 6/2011 | Krishnamurthy | H04L 5/0007 370/330 |

(Continued)

OTHER PUBLICATIONS

International Search Report and Written Opinion dated Dec. 4, 2012 for International Application No. PCT/SE2012/050840, International Filing Date: Jul. 17, 2012 consisting of 15-pages.

(Continued)

*Primary Examiner* — Robert C Scheibel
*Assistant Examiner* — Prenell Jones
(74) *Attorney, Agent, or Firm* — Christopher & Weisberg, P.A.

(57) ABSTRACT

A network node, a UE and respective methods therein are provided for enabling transmission of data using a resource element reserved for CRS. The method in the network node for scheduling a downlink data transmission to the UE currently connected to the network node, comprises determining to schedule data transmission to the UE using at least one resource element reserved for transmitting CRSs during at least one subframe; and transmitting data to the UE using the at least one resource element reserved for transmitting the at least one CRS during the at least one subframe.

24 Claims, 13 Drawing Sheets

(56) References Cited

U.S. PATENT DOCUMENTS

| | | | | |
|---|---|---|---|---|
| 2011/0244877 | A1* | 10/2011 | Farajidana | H04L 5/0023 455/452.2 |
| 2012/0014330 | A1* | 1/2012 | Damnjanovic | H04L 5/001 370/329 |
| 2012/0020421 | A1* | 1/2012 | Larsson | H04L 5/0032 375/260 |
| 2012/0134273 | A1 | 5/2012 | Bhattad et al. | |
| 2013/0315168 | A1* | 11/2013 | Frank | G01S 5/10 370/329 |
| 2015/0131587 | A1* | 5/2015 | Mazzarese | H04W 72/042 370/329 |

OTHER PUBLICATIONS

3GPP TSG-RAN Working Group 1, Meeting #56bis, 3GPP Draft; R1-091591, Seoul, Korea; Agenda Item 15.1, Source: Nortel, Title: "Discussion on RS Design for Higher-Order MIMO in LTE-A", Document for Discussions, XP050339139, 3rd Generation Partnership Project (3GPP), Mobile Competence Centre; 650, Route Des Lucioles; F-06921 Sophia-Antipolis Cedex; France, Mar. 23-27, 2009 consisting of 7-pages.

Huawei et al.: (3GPP) TSG_RAN-WG1 Meeting #59bis, 3GPP Draft; R1-100747, Valencia, Spain, Title: "MCCH Change Notification Using DCI Format 1C", 36.212, CR0096, XP050597989, 3rd Generation Partnership Project (3GPP), Mobile Competence Centre; 650, Route Des Lucioles; F-06921 Sophia-Antipolis Cedex; France, Jan. 18-22, 2010 consisting of 3-pages.

Ketonen et al.: "Decision Directed Channel Estimation for Improving Performance in LTE-A", Signals, Systems and Computers (ASILOMAR), 2010 44th Asilomar Conference on Signals, Systems and Computers, Pacific Grove, CA, USA, IEEE, Piscataway, NJ, USA, pp. 1503-1507, XP031860814, DOI: 10.1109/ACSSC.2010.5757787 ISBN: 978-1-4244-9722-5, Nov. 7-10, 2010 consisting of 5-pages.

3GPP TSG RAN WG1 Meeting #63; 3GPP Draft; R1-105936, RAN WG1, Jacksonville, FL, USA; Title: "Consideration on Available and Further Techniques for CRS Interference Mitigation", XP050489465, 3rd Generation Partnership Project (3GPP), Mobile Competence Centre; 650, Route Des Lucioles; F-06921 Sophia-Antipolis Cedex; France, Nov. 15-19, 2010 consisting of 6-pages.

* cited by examiner

☒ R_0: RS on antenna port 0

▨ R_1: RS on antenna port 1

⊞ R_1: RS on antenna port 2

☰ R_1: RS on antenna port 3

⊞ Not used for transmission on these antenna ports

Fig. 2c continued

NETWORK NODE AND A METHOD THEREIN FOR SCHEDULING A DOWNLINK DATA TRANSMISSION TO A UE, AND A UE AND A METHOD THEREIN FOR RECEIVING A DOWNLINK DATA TRANSMISSION

TECHNICAL FIELD

The present disclosure relates to communication in a wireless communication network and in particular to downlink data transmission in a wireless communication network.

BACKGROUND

Wireless communication networks provide a plurality of different services to users. A user typically has a user equipment, UE, e.g. a mobile phone, a laptop, Personal Digital Assistant, PDA or any other type of terminal be which the user makes use of one or more services offered by the wireless communication network.

The wireless communication network may be based on a variety of different technologies both with regards the Radio Access Network, RAN, and also for the Core Network. One example of such a technology is Long Term Evolution, LTE. LTE uses Orthogonal Frequency-Division Multiplexing, OFDM, in the downlink and Discrete Fourier Transform, DFT-spread OFDM in the uplink. The basic LTE physical communication resources can thus be seen as a time-frequency grid, as illustrated in the example in FIG. 1, where each resource element corresponds to one subcarrier during one OFDM symbol interval (on a particular antenna port). LTE provides sophisticated mobility capabilities for a UE to seamlessly move within the network, as well as detect the presence of a network.

The mobility is based on a continuous search for the presence certain signals of the LTE system. A logical cell in LTE is, currently, defined by the presence of a primary synch signal, PSS, a secondary synch signal, SSS, a physical broadcast channel, PBCH, and a cell-specific reference signal, CRS.

Prom the PSS, a UE may determine a slot timing, ID within a Physical Cell ID, PCI, group. From the SSS, a UE may next determine a radio frame timing, the PCI, a cyclic prefix length, and if Time Division Duplex, TDD, or Frequency Division Duplex, FDD, is applied. From the PCI, a UE may determine shifts used for the CRS, and thus the resource element positions within a physical resource block, PRB, that are used for the first port of the CRS. This allows the UE to decode the PBCH, which provides more complete information of the system configuration, including the system bandwidth.

Since the system bandwidth is unknown to the UE before decoding the BCH, the PSS, SSS, and BCH are only transmitted on a minimum supported system bandwidth, corresponding to the centre 6 PRBs of the system bandwidth.

When a UE has found (and registered to) a system, the UE will continuously perform mobility measurements on neighbouring cells, which involves searching for the presence of neighbour-cells' PSS/SSS, and measuring reference signal received power, RSRP, and reference signal received quality, RSRQ, of any CRS associated with a detected PSS/SSS. Note that these measurements will only be performed assuming the minimum system bandwidth in the neighbouring cell, since the actual system bandwidth in the neighbour-cell is unknown to the UE.

The cell-specific reference signal, also known as the common reference signal, is broadcasted periodically by LTE systems to provide a UE the ability to measure the channel used for certain downlink transmissions. The CRS is, for example, used to demodulate the PBCH, but also for demodulation of the physical downlink shared channel, PDSCH, for, for example, transmission modes 1-4, which are the transmission modes that are primarily used for communication to any LTE Release-8 and Release-9 UE, that is the $3^{rd}$ Generation Partnership Project, 3GPP technical specification for LTE release 8 and 9 respectively. For these transmission modes, the CRS are also utilized for the purpose of channel state information, CSI, measurements which are reported to the network for improved link adaptation and multiple-input multiple-output, MIMO, downlink processing.

The CRS position in the time/frequency grid for a PRB pair in case of 1, 2 and 4 transmitting antennas is illustrated in FIGS. 2a-2c. Between cells, the RS may be shifted in frequency domain.

The different antenna ports of the CRS are thus mapped to different sets of resource elements in the grid. Moreover, for all resource elements assigned to a CRS port, the corresponding resource elements will be muted (zero-power) on all other antenna ports. The overhead of the CRS thus increases with increasing number of Tx antenna ports (8, 16, and 24 resource elements per PRB pair, for 1, 2 and 4 antennas respectively).

LTE is however evolving to reduce the dependence on CRS as to allow for more flexible network deployments, where the downlink transmissions control are not constrained to be transmitted using the same antenna setup (e.g., the same transmission point, TP), as the CRS.

Transmission mode 9, which was introduced in 3GPP Release-10, and some legacy transmission modes, are demodulated without resorting to the CRS. Instead, a UE-specific demodulation reference signal, DMRS, is signalled, along with the data transmission. The DMRS is pre-coded in the same way as the data transmission, and thus allows the UE to estimate the effective channel comprising both the MIMO processing and the electromagnetic propagation channel. To provide the network with CSI, a separate CSI reference signal, CSI-RS, is transmitted which the UE can utilize for that purpose. UE-specific DMRS provides great flexibility for the network in dynamically adjusting downlink transmissions.

For 3GPP Release-11 an enhanced physical downlink control channel, ePDCCH, is being specified, which may also be decoded without any aid of the CRS. Hence, with transmission mode 9 and ePDCCH, both control and data signalling can be flexibly transmitted to a UE independently of the CRS.

A problem with the existing solutions is that the CRS causes substantial overhead in the downlink transmissions, which was motivated in legacy LTE releases by increased performance for CRS based control channels and transmission modes. However, for DMRS (UE specific RS) based transmission modes the overhead of CRS does not provide any increased performance, and the unused CRS will just cause additional overhead

SUMMARY

The object is to obviate at least some of the problems outlined above. In particular, it is an object to provide a network node and a method therein for scheduling a downlink data transmission to a UE currently connected to the network node, the network node being employed in a wireless communication system. An object is to provide a UE and a method therein for receiving downlink data transmission from a network node, the network node being employed in a wireless communication system. The network node, the UE and the respective method therein enabling the use of resource elements reserved for transmitting or carrying CRS to transmit data from the network node to the UE. These objects and others may be obtained by providing a network node and a UE, and a method in a network node and a method in a UE according to the independent claims attached below.

According to an aspect a method in a network node for scheduling a downlink data transmission to a UE currently connected to the network node, the network node being employed in a wireless communication system is provided. The method comprises determining to schedule data transmission to the UE using at least one resource element reserved for transmitting Cell-specific Reference Signals, CRSs, during at least one subframe; and transmitting data to the UE using the at least one resource element reserved for transmitting the at least one CRS during the at least one subframe.

According to an aspect, a method in a UE for receiving downlink data transmission from a network node, the network node being employed in a wireless communication system is provided. The method comprises receiving a downlink transmission from the network node; and receiving signalling from the network node indicating that at least one resource element, reserved for transmitting at least one CRS comprises data intended for the UE during at least one subframe. The method further comprises determining which resource elements in the received downlink transmission that comprise data based on at least the received signalling.

According to an aspect, a network node adapted for scheduling a downlink data transmission to a UE currently connected to the network node, the network node being employed in a wireless communication system, is provided. The network node comprises a processing unit adapted to determine to schedule data transmission to the UE using at least one resource element reserved for transmitting CRSs during at least one subframe; and to transmit data to the UE using the at least one resource element reserved for transmitting the at least one CRS during the at least one subframe.

According to an aspect, a UE adapted for receiving downlink data transmission from a network node, the network node being employed in a wireless communication system. The UE comprises a processing unit adapted to receive a downlink transmission from the network node; and to receive signalling from the network node indicating that at least one resource element, reserved for transmitting at least one CRS comprises data intended for the UE during at least one subframe. The processing unit further is adapted to determine which resource elements in the received downlink transmission that comprise data based on at least the received signalling.

The network node, the UE and the respective method therein have several advantages. By using at least one resource element reserved for transmitting CRS during the at least one subframe for transmitting data, the overhead caused by CRS may be reduced in LTE communication systems of 3GPP release 10 or newer. Another advantage is that the spectral efficiency may be increased. Another advantage is that the impact on UEs supporting only 3GPP release 8 or 9 may be limited.

BRIEF DESCRIPTION OF DRAWINGS

Embodiments will now be described in more detail in relation to the accompanying drawings, in which.

DETAILED DESCRIPTION

Briefly described, exemplifying embodiments of a network node and a method therein for scheduling a downlink data transmission to a User Equipment, UE, currently connected to the network node are provided. Further, exemplifying embodiments of a UE and a method therein for receiving downlink data transmission from a network node is also provided. The downlink transmission comprises utilising at least one resource element reserved for transmitting at least one CRS during the at least one subframe for transmission of data from the network node to the UE.

The embodiments described herein are employable in any wireless communication network base on OFDM radio access technology, e.g. LTE. Further, LTE may be employed with a heterogeneous network architecture and/or a homogeneous network architecture. Homogeneous network architectures comprise, in general, mainly Radio Base Stations, RBSs, having equal or similar maximum transmission output power. Heterogeneous network architectures comprise a plurality of RBSs having different maximum transmission output power. In general a heterogeneous network architecture comprises macro RBSs having a relatively high maximum transmission output power and a plurality of low power RBSs having relatively low maximum transmission output powers in comparison to the macro RBSs. Some examples of low power RBSs are pico, micro, relay and home RBSs.

There are at least two different methods or solutions how to implement a heterogeneous network architecture. One example is where at least one low power RBS being deployed within the coverage area of a macro RBS has the same cell identity, cell-id, as the macro RBS. This is called shared cell-id. Another example is where at least one low power RBS being deployed within the coverage area of a macro RBS has an own cell-id which is different from the cell-id of the macro RBS.

Figure 1:
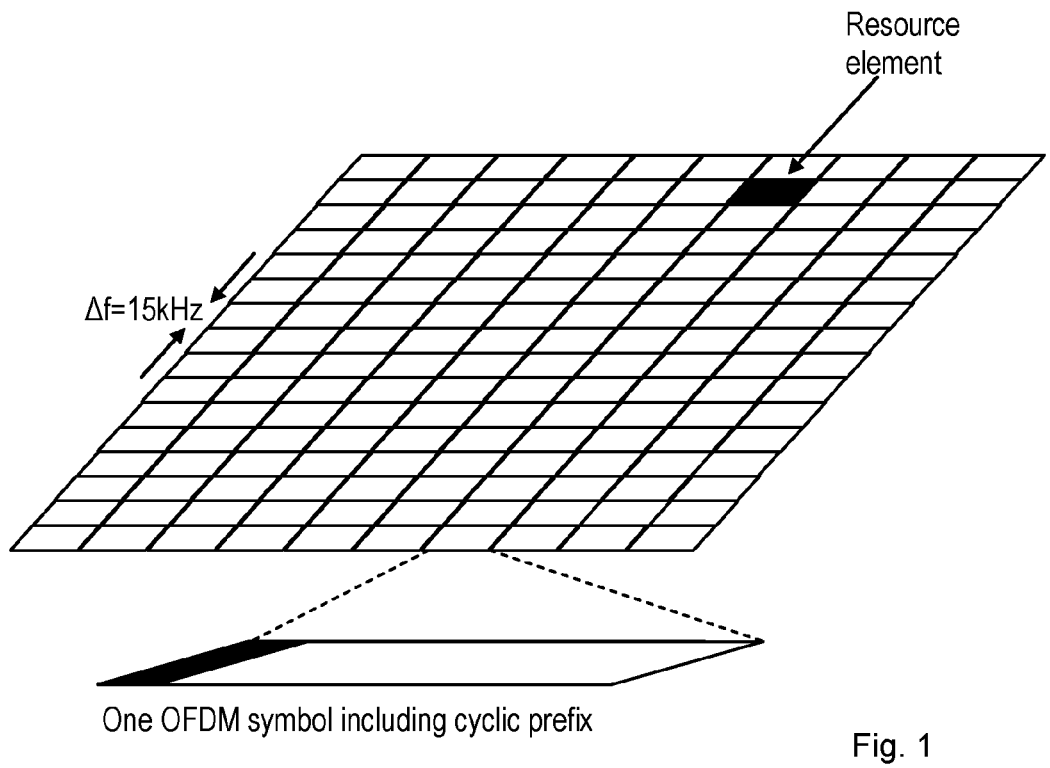
FIG. 1 is an architecture overview of a macro and low power RBS deployment.
Figure 2A:
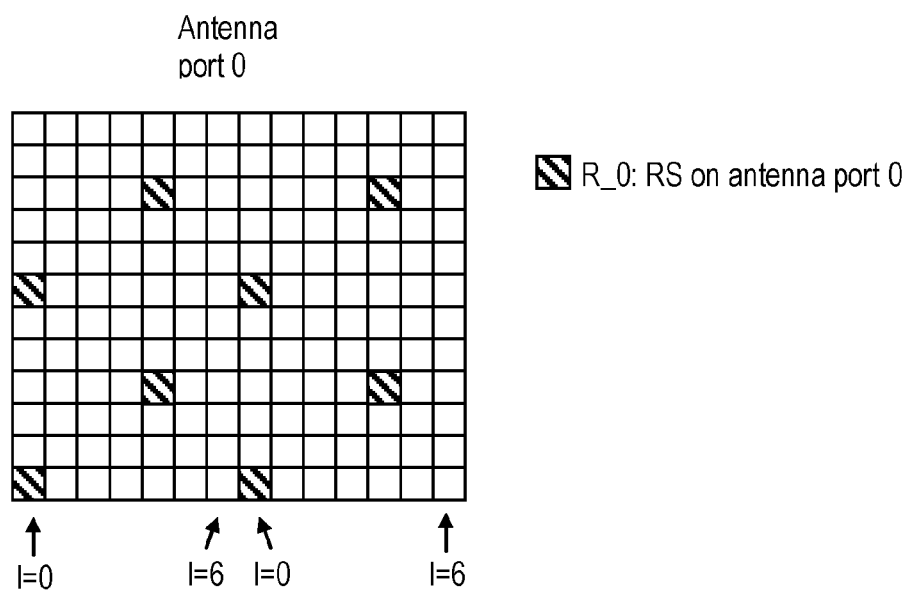
FIG. 2a is an illustration of the CRS resource element mapping with a PRB for one antenna port.
Figure 2B:
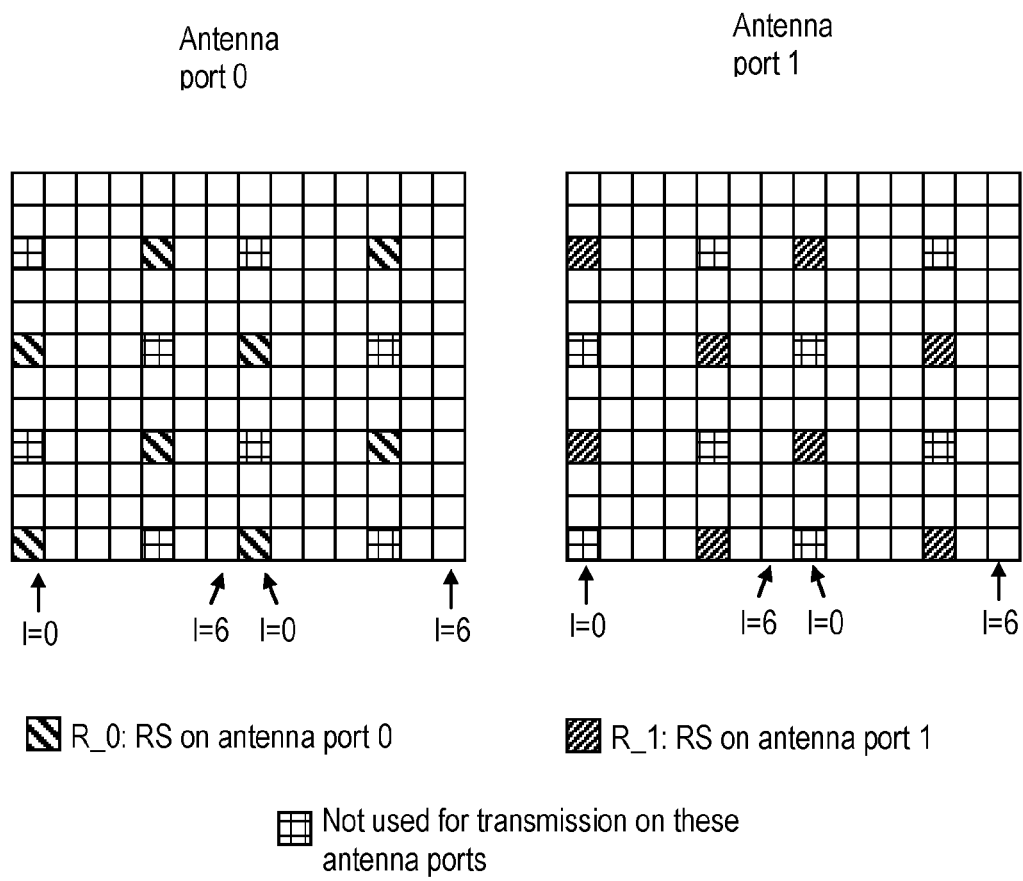
FIG. 2b is an illustration of the CRS resource element mapping with a PRB for two antenna ports.
Figure 2C:
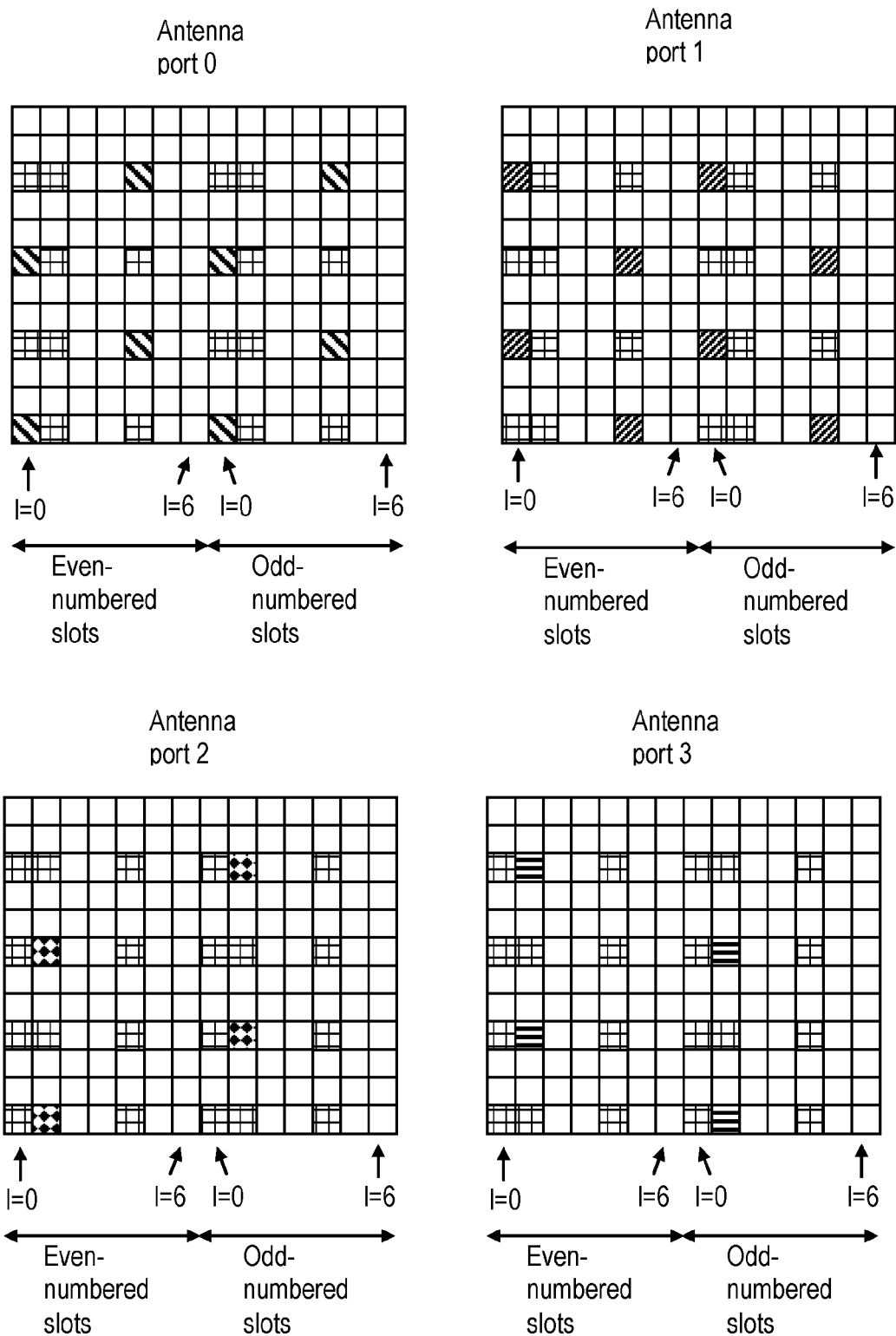
FIG. 2c is an illustration of the CRS resource element mapping with a PRB for four antenna ports.
Figure 3:
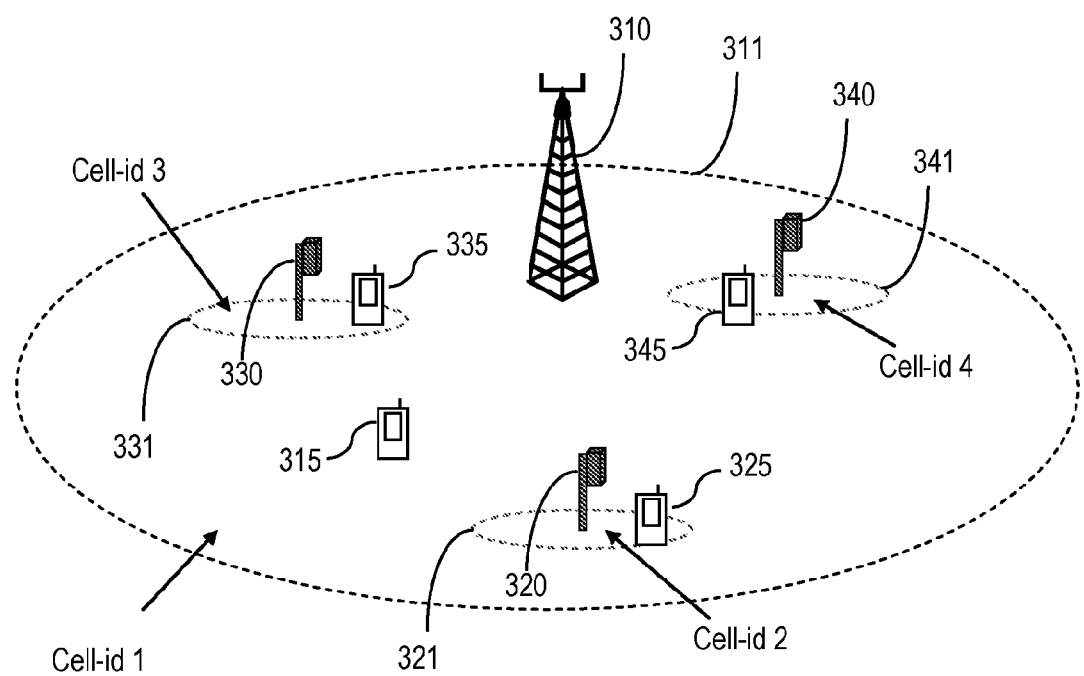
FIG. 3 is an illustration of a multiple cell-id heterogeneous deployment with an individual cell-id solution.

A heterogeneous deployment according to 3GPP Release-10, enhanced Inter-Cell Interference Coordination, eICIC, principles uses a separate cell-id for each transmission/reception point. An example of a transmission/reception is an RBS. Different synchronisation, broadcast and UE-specific control channels are thus transmitted from each point. Signals from a macro point belong to a different cell than signals from the low power points, which in turn form individual cells. Such a multiple cell-id heterogeneous deployment is illustrated in FIG. 3. An example of a definition of a cell is the coverage area of an RBS. In FIG. 3 a macro RBS or point 301 is illustrated having a coverage area or cell 311. The cell-id of the point 301 or the cell 311 is denoted "cell-id 1". Within the cell 311, three different low power RBSs or points are illustrated 320, 330 and 340. Each of the low power RBSs/points has a coverage area or cell 321, 331 and 341. A UE 325, 335 and 345 is also illustrated at being present in each of the low power cells 321, 331 and 341. Further each of the low power cells is associated with an individual cell-id, denoted "cell-id 2", "cell-id 3" and "cell-id 4".

Instead of using a separate cell-id for each point, all the points (macro as well as low power) within the coverage area of a macro point can share the same cell-id, i.e., they belong to the same cell. The shared cell-id approach is illustrated in FIG. 4 for a scenario where the pico points are Remote Radio Units, RRUs, connected with fibre to a central base station or RBS that also handles or controls the macro point.

Figure 4:
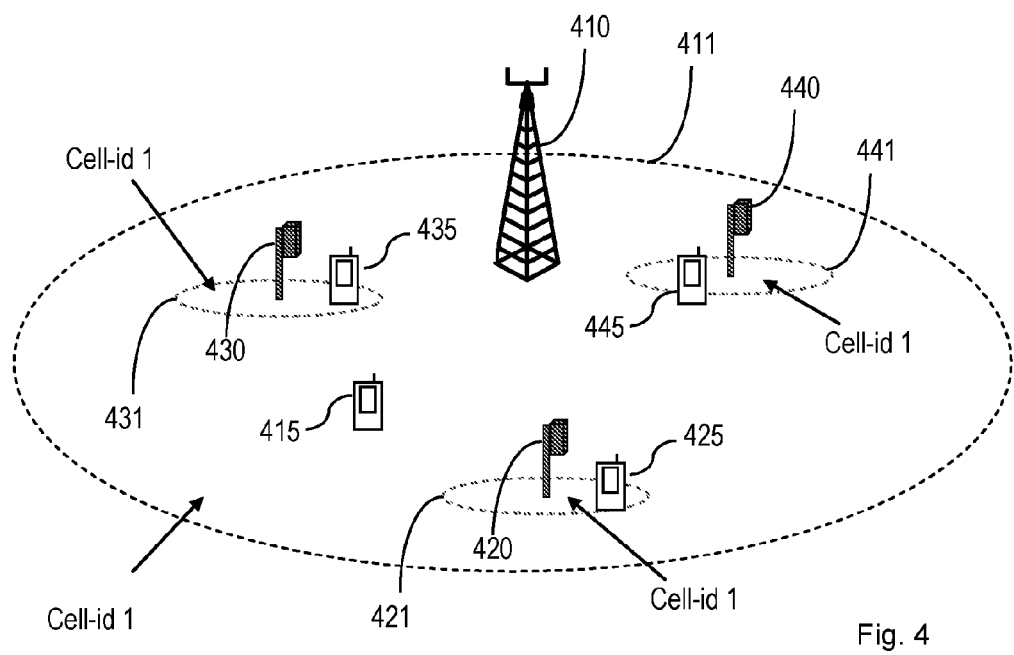
FIG. 4 is an illustration of a multiple cell-id heterogeneous deployment with a shared cell-id solution

In FIG. 4 a macro point 401 is illustrated having a coverage area or cell 411. The cell-id of the point 401 or the associated cell 411 is denoted "cell-id 1". Within the cell 411, three different low power points are illustrated 420, 430 and 440. Each of the low power points has a coverage area or cell 421, 431 and 441. A UE 425, 435 and 445 is also illustrated at being present in each of the low power cells 421, 431 and 441. Further each of the low power cells is associated with the same cell-id as the macro point, namely "cell-id 1".

There are different options on how to transmit the CRS and the CRS dependent signals in a shared cell configuration. Two examples are transmitting CRS only from the macro transmission point and transmitting CRS from all transmission points.

In the example of only transmitting the CRS from the macro transmission point, also the PSS/SSS, BCH, and CRS based control channels must be transmitted from the macro node or point only. This configuration is advantageous when the macro node provides full coverage also within the coverage areas of the low power points or nodes, and the low power points or nodes are deployed to extend the high data rate coverage. Moreover such a configuration has energy efficiency benefits, since the low power nodes can be put to sleep whenever they are not actively participating in a downlink transmission. A drawback is that legacy 3GPP Release 8 and 9 UEs will not be able to receive downlink transmissions from the pico nodes.

Figure 5:
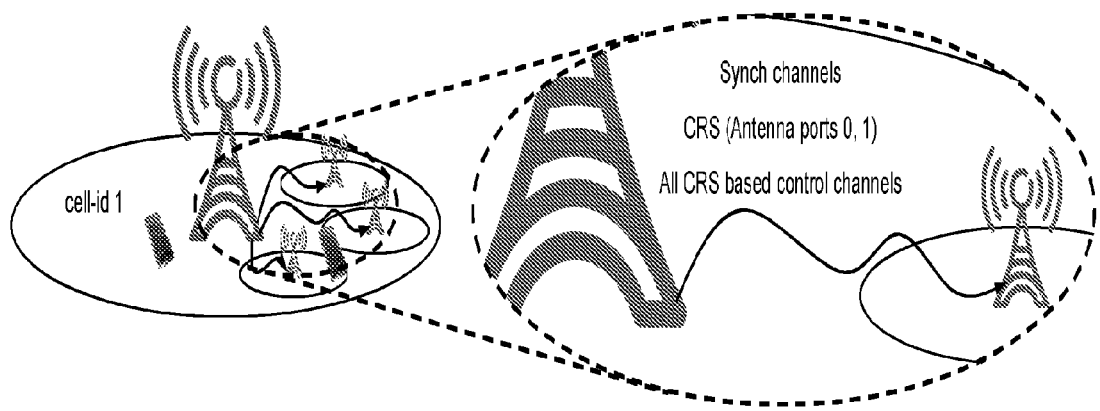
FIG. 5 is an illustration of an example showing the signal distribution from the macro point over fibre to a low power point.

As described above, the shared cell approach can also be implemented by distributing the same cell specific signals on all points (within the macro point coverage area). With such a strategy, the same synch channels PSS/SSS, CRS, broadcast (PBCH) and all other CRS based control channels (Physical Downlink Control Channel, PDCCH, Physical Control Format Indicator Channel, PCFICH, Physical HARQ Indicator Channel, PHICH) are distributed to and transmitted from each point. FIG. 5 depicts an example showing the signal distribution from the macro point over fibre to a low power point. As an example, two CRS based antenna ports (Antenna port 0 and 1) are used within the cell to support up to 2-layer transmission to a single UE.

The cell specific signals are combined over air resulting in an effective $2 \times N_R$ channel as seen by a UE with $N_R$ receive antennas. The combining is similar to what is encountered in single-frequency networks, SFN, for broadcast. Due to the SFN effect, the average received signal strength on the UE side increases, leading to improved coverage of the synchronisation and control channels.

Figure 6:
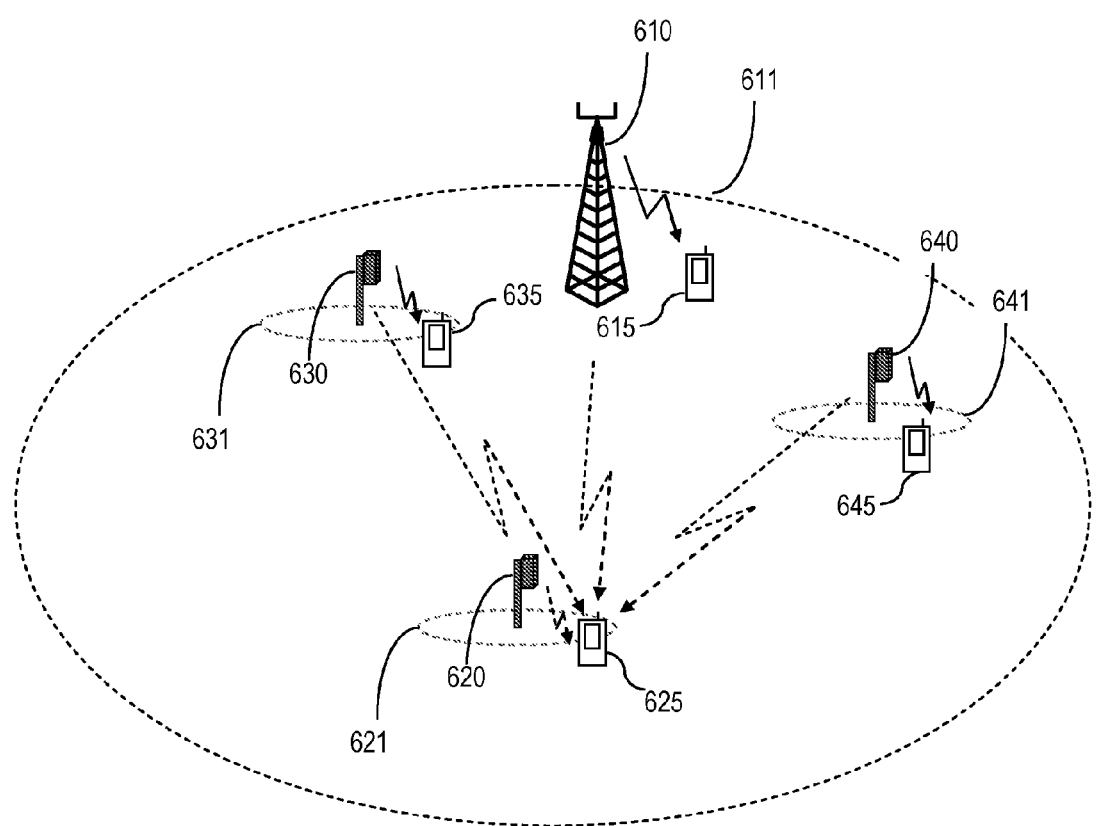
FIG. 6 is an illustration of transmission of PDSCH.

Transmissions on PDSCH that are based on CRS are distributed in a similar manner as for the other cell specific signals. Hence, such a PDSCH is distributed to, and transmitted from, all points that transmit CRS. A scenario where all transmission points transmit the CRS is illustrated in FIG. 6, where the dotted arrows represents a CRS based PDSCH transmission. The received signal level is consequently improved via an SFN effect without relying on area splitting gains. Similarly to the control channels, this SFN benefit may be enjoyed by all UEs configured for CRS based PDSCH transmissions. In particular, it is enjoyed by all 3GPP Release-8/9 UEs, which for FDD typically only support CRS based transmissions.

UE-specific Reference Signal, RS, offers flexibility in that the way the transmission is conducted is transparent to the UE and hence becomes an eNodeB or RBS implementation issue. The eNodeB or RBS may quickly from one subframe to another even switch antennas without the UE knowing about it. This flexibility was a prerequisite for the MU-MIMO techniques in 3GPP Release-10 that rely on flexible pre-coding and can now be exploited in the present shared cell-id approach for re-using the same time-frequency resources on multiple points within the cell. Resource re-use is for both FDD and TDD available for 3GPP Release-10 UEs and onwards, which support UE-specific RS. Thus, the Resource Blocks, RBs, used for one UE receiving a PDSCH from low power point A may be re-used by another UE receiving a PDSCH from low power point B, as long as low power point A and B are sufficiently well-isolated from each other. Note that this re-use of resources across points provides area splitting gains. But SFN type of gains are also possible by transmitting the same PDSCH based on UE-specific RS from multiple points, i.e., utilizing a form of joint transmission coordinated multipoint, CoMP. There is hence total flexibility in the scheduler of the RBS to seamlessly exploit area and SFN gains for maximum performance.

Since the number of different CRS based antenna ports, $N_{CRS}$, are in the presently considered scenario, i.e. the SFN transmission and the CRS, transmitted from all points, it follows that all 3GPP Release-8/9 UEs only supporting CRS see an effective SFN improved $N_{CRS} \times N_R$ channel regardless of the actual number of transmission points, TPs, (in case CRS is only transmitted from the macro TP, they only see the channel to the macro TP). For those UEs, the UE CSI feedback is also based on CRS meaning that the Precoder Matrix Indicator/Rank Indicator, PMI/RI, and the Channel Quality Indicator, CQI, characterizing the SFN improved $N_{CRS} \times N_R$ channel is reported. When a UE is close to a macro/low power point, the effective channel is heavily dominated by the channel from that nearby point and the CSI feedback is essentially targeting the properties of that channel. As a UE moves across the cell area, the feedback sometimes corresponds to a combination of the channels from multiple points.

3GPP Release-10 UEs and beyond support UE-specific RS as part of transmission mode 9 and UE CSI feedback in transmission mode 9 is based on CSI-RS. In contrast to CRS, CSI-RS does not affect other fundamental parts of the system such as control signalling so there is greater flexibility in how to operate it. Radio Resource Control, RRC, configuration of CSI-RS can for example easily be made UE-specific. Under such circumstances it makes sense to let each point transmit CSI-RS on a separate CSI-RS resource. Since the re-use factor for CSI-RS is high, there are good opportunities of maintaining perfect orthogonality within the cell if desired. The eNodeB handling the joint operation of all the points within the macro point's coverage area can then configure the CSI-RS resource that a particular UE should use when estimating the channel for CSI feedback. A UE sufficiently close to a point would typically be configured to measure on the CSI-RS resource used by that point. Different UEs would thus potentially measure on different CSI-RS resources depending on the location of the UE in the cell. The CSI-RS configuration procedure may be based on measurements of uplink signals. Signals to measure on include SRS and PUCCH.

Figure 7:
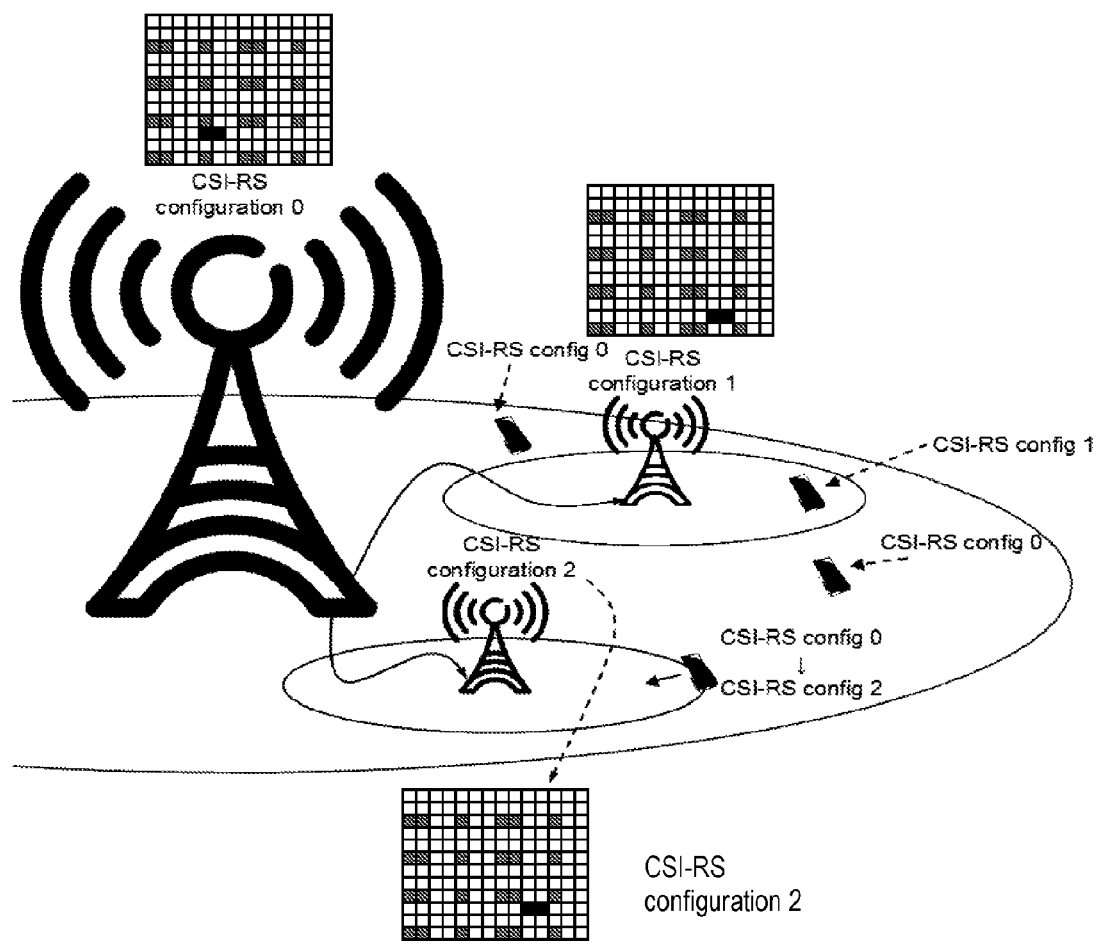
FIG. 7 is an illustration of use of Channel State Information Reference Signal, CSI-RS, within a cell of a macro RBS or point.

FIG. 7 is an illustration of use of Channel State Information Reference Signal, CSI-RS, within a cell of a macro RBS or point. Each point transmits CSI-RS on its own resource and UE specific RRC configuration ensures that the UE measures on the CSI-RS resource corresponding to the "closest" point.

An exemplifying method in a network node for scheduling a downlink data transmission to a User Equipment, UE, currently connected to the network node, the network node being employed in a wireless communication system will now be described with reference to FIGS. 8a and 8b.

Figure 8A:
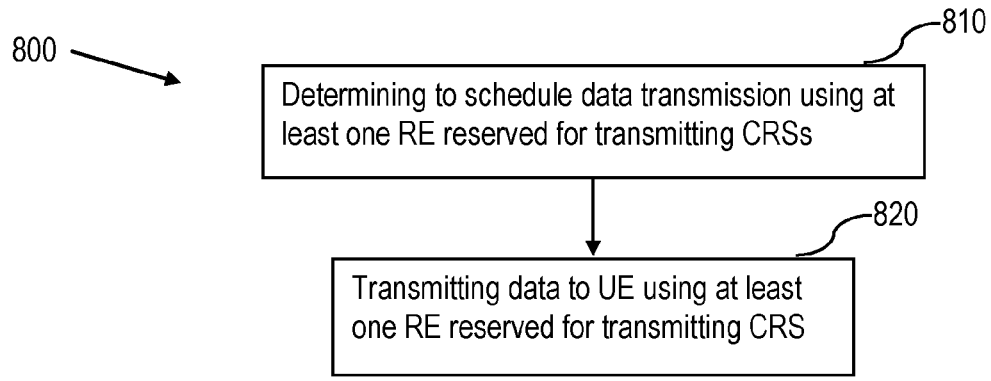
FIGS. 8a and 8b are flowcharts of exemplifying methods in a network node for scheduling a downlink data transmission to a UE currently connected to the network node.

FIG. 8a illustrates the method 800 comprising determining 810 to schedule data transmission to the UE using at least one resource element reserved for transmitting Cell-specific Reference Signals, CRSs, during at least one subframe; and transmitting 820 data to the UE using the at least one resource element reserved for transmitting the at least one CRS during the at least one subframe.

The network node is assumed to continuously transmit CRS as having been explained above. Simultaneously, the network node may or may not be transmitting data using resource elements reserved for carrying data in downlink to a UE. At a point in time, the network node determines to schedule data transmission to the UE using at least one resource element reserved for transmitting CRSs during at least one subframe. As having been described above, there is a plurality of resource elements in a subframe being reserved for carrying CRSs. The network node decides to use at least one of these resource elements for scheduling data transmission to the UE. The network node then transmits data to the UE using the at least one resource element reserved for transmitting the at least one CRS during the at least one subframe. The network node may determine to use more than one resource elements reserved for transmitting CRSs for instead transmitting data to the UE.

The method may have several advantages. By using at least one resource element reserved for transmitting CRS during the at least one subframe for transmitting data, the overhead caused by CRS may be reduced in LTE communication systems of 3GPP release 10 or newer. Another advantage is that the spectral efficiency may be increased. Another advantage is that the impact on UEs supporting only 3GPP release 8 or 9 may be limited.

According to an embodiment, the method further comprises signalling 815 to the UE that the at least one resource element, reserved for transmitting the at least one CRS, comprises data intended for the UE during the at least one subframe.

The UE knows which resource elements in a subframe which are reserved for carrying data in a downlink transmission from the network node to the UE. The UE obtains this information by means of the scheduling grants carried by Downlink Control Information, DCI, formats on PDCCH. The network node further signals to the UE that at least one resource element, reserved for transmitting the at least one CRS, comprises data intended for the UE during the at least one subframe. In this manner, the UE knows that it should read the information carried or comprised in this at least one resource element reserved for transmitting the at least one CRS, in order to obtain or receive the data transmitted from the network node.

According to an embodiment, the signalling comprises setting at least one bit in a DCI format directed to the UE, or the signalling comprises Radio Resource Control, RRC, signalling.

Control signalling is required to support the transmission of the downlink and uplink transport channels. Control information for one or multiple UEs is contained in a Downlink scheduling Control Information, DCI, message and is transmitted through the Physical Downlink Control Channel, PDCCH. The DCI carries detailed information, e.g. which resource block carries data for a specific UE and what kind of demodulation scheme does the UE have to use to decode data and other additional information. It means the UE first has to decode DCI and based on the information you got from the DCI you can decode the real data. The DCI format comprises several bits which are used to indicate, to the UE(s), the information described above. In an example, at least one bit of the DCI is used to signal to the UE that at least one resource element, reserved for transmitting the at least one CRS, comprises data intended for the UE during the at least one subframe. The at least one bit may be a dedicated bit, meaning that the at least one bit only indicates, to the UE, which resource element(s), reserved for transmitting the at least one CRS, comprises data intended for the UE during the at least one subframe. The at least one bit may alternatively not be dedicated for this purpose, but for indicating something different to the UE. In such a case, the at least bit may still be used to indicate which resource element(s), reserved for transmitting the at least one CRS, comprises data intended for the UE during the at least one subframe, by jointly encode the "CRS-information" with other information elements in the DCI.

In still an embodiment, the method further comprises estimating 805 an impact for UEs anticipating continuous transmission of CRS over the system bandwidth for which suspending of transmission of CRS may degrade performance, connection stability and/or mobility.

This means that the network node, serving at least one UE, determines that the consequences would be for this UE if the network node would suspend transmission of CRS over the system bandwidth. In case the UE anticipates continuous transmission of CRS over the system bandwidth, the suspension of transmission of CRS may degrade performance, connection stability and/or mobility for the UE since the UE may lose connection with the network node. A network node may be serving a plurality of different UEs, or having a plurality of different UEs connected to it. The different UEs may have different capabilities. Some UEs may only support 3GPP Release 8 or 9 and hence anticipates continuous transmission of CRS over the system bandwidth. Other UEs may support 3GPP Release 10 or later and hence do not use the CRS. In other words, for some UEs the suspension of transmission of CRS over the system bandwidth may degrade performance, connection stability and/or mobility, and for other UEs, there will not be any consequences from suspending transmission of CRS over the system bandwidth.

One way of estimating an impact for UEs anticipating continuous transmission of CRS over the system bandwidth from temporarily suspending transmission of CRS over the system bandwidth, is to determine how many UEs anticipating continuous transmission of CRS over the system bandwidth are currently connected to the network node. The UEs should further be in RRC_connected state. Assume that the network node is serving a relatively large number of UEs not anticipating continuous transmission of CRS over the system bandwidth compared to the number of UEs anticipating continuous transmission of CRS over the system bandwidth. This means that a large portion of the UEs would be able to increase the spectral efficiency and reducing the CRS overhead by receiving data on at least one resource element reserved for transmitting the at least one CRS during the at least one subframe. Likewise, a relatively small portion may experience degradation in performance, connection stability and/or mobility, since they need the CRS to be continuously transmitted over the system bandwidth.

The network node may be e.g. a macro RBS, a low power RBS or an eNodeB. In case the network node is a low power RBS or point, the probability that a UE anticipating continuous transmission of CRS over the system bandwidth is connected to the low power RBS or point is relatively small, since it is expected that, as time goes, there will be less and less UEs anticipating continuous transmission of CRS over the system bandwidth. In case the network node is a macro power RBS or point, the probability that a UE anticipating continuous transmission of CRS over the system bandwidth is connected to the macro RBS or point may be larger than the probability for the low power RBS or point. This is due to that a macro RBS or point in general has a larger number of UEs connected to it than a low power RBS or point. The more UEs that are connected to an RBS or point, the larger the probability is that there is at least one UE anticipating continuous transmission of CRS over the system bandwidth connected to the RBS. Hence, estimating an impact for UEs anticipating continuous transmission of CRS over the system bandwidth for which suspending of transmission of CRS may degrade performance, connection stability and/or mobility might be even more useful for a macro RBS or point than for a low power RBS or point.

Depending on the estimation, the network node may make a decision to determine to schedule data transmission to the UE using at least one resource element reserved for transmitting CRSs during at least one subframe; and to transmit data to the UE using the at least one resource element reserved for transmitting the at least one CRS during the at least one subframe. Likewise, the network node may make a decision not the use any resource elements reserved for transmitting CRSs for transmitting data to the UE.

According to yet an embodiment, using resource elements, reserved for transmission of CRS, for transmitting data to the UE during at least one subframe, is performed on a portion of the system bandwidth.

The system bandwidth may comprise a relatively large number of physical resource blocks, PRBs, e.g. up to 100 PRBs in LTE for a system bandwidth of 20 MHz. In this embodiment, the network node uses resource elements, reserved for transmission of CRS, for transmitting data to the UE during at least one subframe in some of the PRBs of the system bandwidth. This means that in the remaining PRBs, the CRS is still continuously transmitted and hence the impact of temporarily suspending transmission of CRS on only some of the PRBs may limit the impact on those UEs anticipating continuous transmission of CRS. Further, the network node may instruct, by means of signalling, the UEs anticipating continuous transmission of CRS to camp on the part of the bandwidth comprising PRBs where the CRS is still continuously transmitted.

In an embodiment, the network node is employed in an LTE communication network, wherein the at least one resource element reserved for transmitting the at least one CRS is not comprised in any of the six centre resource blocks of a system bandwidth.

In LTE, the minimum defined system bandwidth corresponds to six PRBs. UEs that perform network measurements typically exploit only the six centre PRBs for such purpose, e.g. when a UE listens to a neighbouring RBS. Therefore, in this example, the CRSs in the six centre RBSs are never suspended and no date is transmitted on any resource element reserved for transmitting the CRS in these six PRBs. However, on any resource element reserved for transmitting the CRS in at least one, up to all other PRBs, outside of the six centre PRBs may be used for transmitting data to the UE.

In another embodiment, the method comprising determining a predefined number of subcarriers in the centre of a system bandwidth with regards to frequency, and transmitting CRS with decreasing power for subcarriers increasingly distant, with regard to frequency, from the predefined subcarriers in the centre of the system bandwidth.

As described above, the system bandwidth may comprise a relatively large number of physical resource blocks, PRBs, e.g. 100 PRBs. Each resource block comprises 12 contiguous 15 kHz subcarriers in the frequency domain. This means that one PRB spans a frequency of 180 kHz (12·15 kHz). In the example of the system bandwidth comprising 100 PRBs the system bandwidth then is 100*180 kHz=18000 kHz=18 MHz. In an example, a certain number of subcarriers in the centre of the bandwidth are predefined. On these centre subcarriers, the CRSs are transmitted with full, or normal, transmission power according to a downlink transmission power control. Outside of these predefined centre subcarriers, the CRS is transmitted with decreasing power for subcarriers increasingly distant, with regard to frequency, from the predefined subcarriers in the centre of the system bandwidth. This means that on the outermost located subcarriers, with regards to frequency, i.e. at the edges of the system bandwidth, the CRS may be transmitted with very low transmission power, or may not be transmitted at all.

According to an embodiment, the further comprising transmitting all resource elements reserved for CRS with a reduced power in the entire subframe.

In this embodiment, the network node reduces the power with which the CRS is transmitted. The resource elements reserved for carrying, or transmitting, CRS are transmitted with a reduced power in the entire subframe. This results in that the power consumption may be reduced. Further, the interference produced towards data/CRS from other RBSs may be reduced.

According to another embodiment, the method further comprises ramping the transmission power of CRS up or down between two predetermined transmission power values during at least two subframes.

In this embodiment, some UEs might combine CRS over longer periods, e.g. some subframes, for determining or performing some measurements. Abruptly switching on/off CRS might result in a degraded performance for such implementations. However, due to support of high speed UEs in LTE, all implementations are expected to be able to cope with CRS decorrelating in time. Ramping up/down the CRS power is a way of turning on/off CRS by mimicking a more natural profile compared to an abrupt switch, which is expected to not be harmful for UE performance in measurements and/or CRS based estimation.

In an embodiment, the method further comprises transmitting the CRS at reduced transmit power in a resource block and simultaneously transmitting data to the UE using at least one resource element reserved for transmitting the at least one CRS.

This means that in a resource block, the resource elements reserved for carrying, or transmitting, CRS are transmitted with a reduced power in the entire subframe. Simultaneously, at least one resource element reserved for transmitting the at least one CRS is used for transmitting data to the UE. This results in that the power consumption may be reduced. Further, the interference produced towards data/CRS from other RBSs may be reduced as well as the interference experienced by the network node itself.

Embodiments here in also relate to a method in a UE for receiving downlink data transmission from a network node, the network node being employed in a wireless communication system. Such a UE will now be described with reference to FIG. 9.

Figure 9:
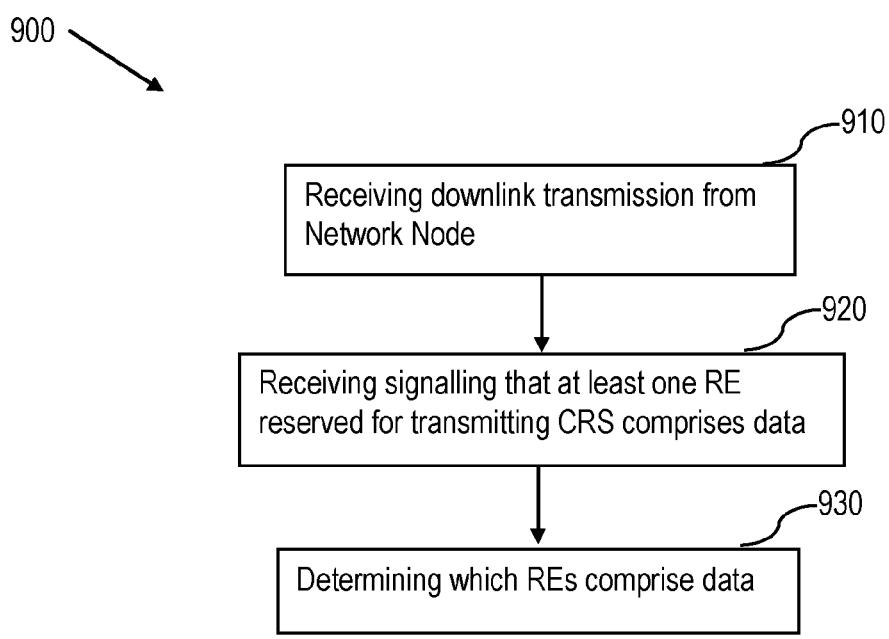
FIG. 9 is a flowchart of a method in a UE for receiving a downlink transmission from a network node according to an embodiment.

FIG. 9 illustrates the method 900 comprising receiving 910 a downlink transmission from the network node; and receiving 920 signalling from the network node indicating that at least one resource element, reserved for transmitting at least one CRS comprises data intended for the UE during at least one subframe. The method further comprises determining 930 which resource elements in the received downlink transmission that comprise data based on at least the received signalling.

The UE receives a downlink transmission from the network node. The UE further receives signalling from the network node indicating that at least one resource element, reserved for transmitting at least one CRS comprises data intended for the UE during at least one subframe. By the signalling, the UE is aware not only which resource elements comprise or carry data, but also that at least one resource element reserved for transmitting at least one CRS comprises data intended for the UE. This means that the UE is able to determine which resource elements in the received downlink transmission that comprise data based on at least the received signalling. Once the UE knows which resource elements comprise data intended for the UE, the UE can read, or receive, all the data intended for the UE in the received subframe from the downlink transmission from the network node.

The method in the UE has corresponding advantages as the method in the network node. This is because the UE and the network node cooperate in the transmission (from the network node) and the reception (by the UE) of the downlink transmission. By using at least one resource element reserved for transmitting CRS during the at least one subframe for transmitting data, the overhead caused by CRS may be reduced in LTE communication systems of 3GPP release 10 or newer. Another advantage is that the spectral efficiency may be increased. Another advantage is that the impact on UEs supporting only 3GPP release 8 or 9 may be limited.

In an embodiment, the signalling received from the network node comprises a DCI format directed to the UE wherein at least one bit is set to indicate that at least one resource element, reserved for transmitting at least one CRS comprises data intended for the UE during at least one subframe, or the signalling comprises RRC signalling.

As described above, control signalling is required to support the transmission of the downlink and uplink transport channels. A DCI message or format is transmitted through the PDCCH. The DCI carries detailed information, e.g. which resource block carries data for a specific UE and what kind of demodulation scheme does the UE have to use to decode data and other additional information. It means the UE first has to decode DCI and based on the information you got from the DCI you can decode the real data. The DCI format comprises several bits which are used to indicate, to the UE(s), the information described above. In an example, at least one bit of the DCI is used to signal to the UE that at least one resource element, reserved for transmitting the at least one CRS, comprises data intended for the UE during the at least one subframe. The at least one bit may be a dedicated bit, meaning that the at least one bit only indicates, to the UE, which resource element(s), reserved for transmitting the at least one CRS, comprises data intended for the UE during the at least one subframe. The at least one bit may alternatively not be dedicated for this purpose, but for indicating something different to the UE. In such a case, the at least bit may still be used to indicate which resource element(s), reserved for transmitting the at least one CRS, comprises data intended for the UE during the at least one subframe, by jointly encode the "CRS-information" with other information in the DCI.

In still an embodiment, determining 930 which resource elements in the received downlink transmission comprising data is further based on information comprised in a PDCCH.

A given transmission point, i.e. network node, may employ the above described different embodiments and examples on different parts of the system bandwidth and/or at different time instances; that is in different subframes. The embodiment or example employed on a given set of PRBs and/or subframes may be signalled to the UEs in a semi-static fashion, e.g., by RRC signalling, and/or in a dynamic fashion, e.g. by exploiting one or more information bits included in DCI formats directed to the UE as described above.

Further, the network node may employ the above described different embodiments and examples for different UEs that are connected to the network node.

In case of CoMP and possibly heterogeneous network deployments, different network nodes in the network may employ different embodiments/examples of those described above for the corresponding subframe and/or PRB. For example, if no UEs anticipating continuous transmission of CRS over the system bandwidth for which suspending of transmission of CRS may degrade performance, connection stability and/or mobility are connected to a low power network node, the network may employ an embodiment/example that does not require CRS transmission at the pico node, while it employs the continuous transmission of CRS over the system bandwidth at the macro network node in order to support UEs anticipating continuous transmission of CRS over the system bandwidth that are in idle state and/or UEs that are connected to the macro network node.

In an example, a predefined choice between two embodiments, any of the embodiments described above, is dynamically signalled by for example at least one bit in the DCI format. The embodiments indicated by the DCI format may be, for example, pre-defined at both UE and network side, e.g. from an agreed list, or they can be configured in a semi-static fashion.

In still an example, the CRS and related signals are not transmitted from a particular low power transmission point, e.g. the CRS is only transmitted from the macro transmission point, and the resource elements corresponding to a CRS allocation are thus free for use at the low transmission point for a downlink transmission. Hence, if there is no UE anticipating continuous transmission of CRS over the system bandwidth in the close vicinity of the low power transmission point, the eNodeB of the low power transmission point can inform a first UE to receive data from the low power transmission point also on the resource elements associated with a CRS transmission and transmit data accordingly. However, if there are UEs anticipating continuous transmission of CRS over the system bandwidth in the vicinity, they will see increased interference on the CRS, which could impact the performance of the UEs anticipating continuous transmission of CRS over the system bandwidth. For such a case, the eNodeB of the low power transmission point may inform the first UE to map the data transmission around the CRS resource elements and transmit accordingly. Moreover, if the eNodeB of the macro transmission point transmits downlink data from the macro transmission point to the first UE, the CRS resource elements are occupied by CRS and the eNodeB thus signal to the UE that the data transmission is to be mapped around the CRS resource elements and transmits accordingly.

In yet another example, the CRS is transmitted also from a particular low power transmission point as to provide better reception/mobility to UEs anticipating continuous transmission of CRS over the system bandwidth. However, when there are no UEs anticipating continuous transmission of CRS over the system bandwidth relying on the low power transmission point CRS, the eNodeB of the low power transmission point may inform a first UE that the data transmission will be mapped onto the CRS resource elements and transmit accordingly to the first UE, i.e. puncture the CRS, at least, on the downlink resources allocated to the first UE.

In still an example, the downlink data transmission is only mapped onto a subset of the resource elements associated with the CRS. In a refined example this set of resource elements is specified as a function of system parameters. In another embodiment this set of resource elements is configured to a UE by the network.

In one such example, CRS resource elements associated with specific CRS port(s) are restricted so that data transmissions are not mapped onto them. For example resource elements associated with CRS port 1 could be restricted, so that only resource elements associated with CRS ports 2, 3 and 4 are reused for data transmissions. Or CRS ports 1 and 2 can be restricted so that only resource elements associated with CRS ports 3 and 4 are reused for data transmissions.

In another exemplifying configuration, the CRS REs of specific CRS port(s) in a specific sub-band are restricted.

An advantage of the above described examples of configurations is that UE mobility measurements, including RSRP measurements, PBCH decoding, etc, are only based on the presence of the CRS in the centre 6 PRBs and on typically only on the first CRS port (and, if the presence can be reliably detected by the UE, possibly also on the second CRS ports). Hence, the mobility measurements of UEs anticipating continuous transmission of CRS over the system bandwidth can be protected for improved robustness.

Alternatively, in still an example, the CRS resource element reuse is configured to be restricted on a selected sub-band so that UEs anticipating continuous transmission of CRS over the system bandwidth will operate predictably at least within said sub-band.

An additional embodiment that can be combined with any of the above embodiments comprises of gradually switching from one embodiment to another one by ramping up or down the power of CRS and/or physical channels and/or other reference signals that are mapped on CRS resource elements according to 3GPP Release 8 or 9. The ramp should last over a number of OFDM symbols or subframes. The power for the channels and/or reference signals transmitted over CRS resource elements according to 3GPP Release 8 or 9 may be increased or decreased with uniform or non-uniform steps. The power steps may be applied per subframe or per OFDM symbol.

In a further example, the power ramping up procedure as described in the previous embodiment is triggered corresponding to a downlink transmission for a UE anticipating continuous transmission of CRS over the system bandwidth, so that CRS are transmitted with full power in the corresponding PDSCH/PDCCH subframe. Similarly, a power ramp down procedure may be triggered after a PDSCH/PDCCH transmission or a burst of PDSCH/PDCCH transmissions towards a UE anticipating continuous transmission of CRS over the system bandwidth have been completed.

Figure 10:
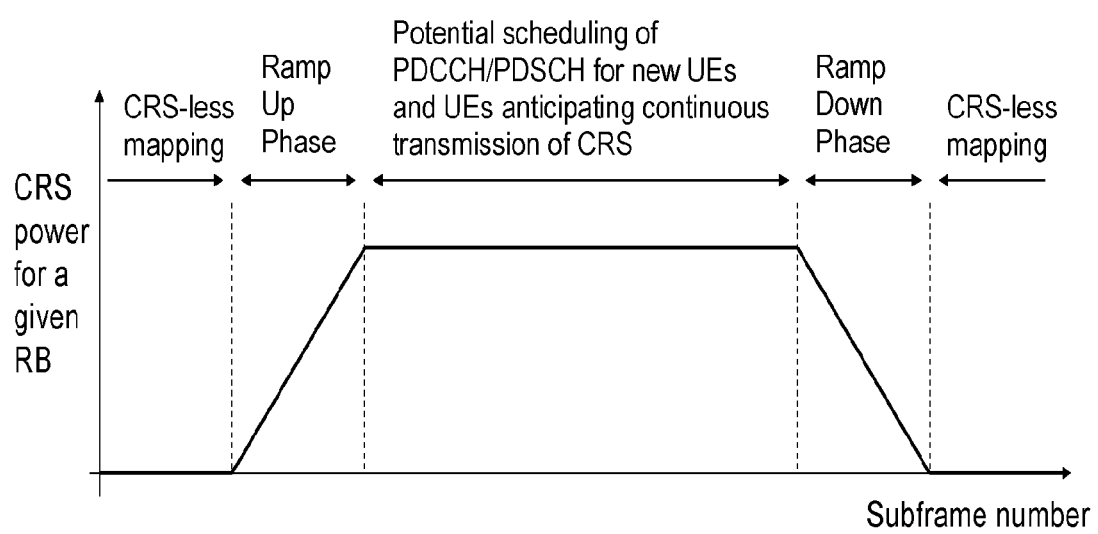
FIG. 10 is an illustration of an example of ramping the transmission power up and down.

A power ramp up and down example is illustrated in FIG. 10.

In a further example the network, the RBS or the eNodeB may configure the terminals with a CRS averaging time that is based on the duration of the ramp.

In another example, the gradual shifting between embodiments is performed in the frequency domain, as opposed to in the time domain. Also, the gradual shifting between embodiments may be performed both in time and frequency domain.

In still an example, an eNodeB determines a CRS dependency assessment for a particular UE anticipating continuous transmission of CRS over the system bandwidth to perform a particular measurement and/or reception of a physical channel, e.g. PDCCH, PDSCH, PBCH, which comprises a particular embodiment for CRS for said (and/or preceding said) particular measurement and/or reception. Moreover, the eNodeB follows the particular embodiment for said measurement and/or reception.

In one such example, the CRS dependence assessment is based on a channel Doppler estimate acquired by the eNodeB. In a refined such example, said CRS dependence assessment is determined from the Doppler estimate by estimating which subframes of CRS a UE relies upon for receiving a signal in a particular subframe.

In another such example, the CRS dependence assessment is based on a quantity that relates to the RSRP and/or RSRQ of a UE (i.e., how deep into the cell the UE is). For example, the UE anticipating continuous transmission of CRS over the system bandwidth may perform mobility measurements (e.g., RSRP/RSRQ measurements), but the network or RBS/eNodeB is sure of that the UE is deep into the cell making those reports unnecessary and hence the accuracy of the measurements becomes irrelevant, which would allow the CRS dependence assessment not requiring excessive presence of CRS.

Embodiments herein also relate to a network node adapted for scheduling a downlink data transmission to a User Equipment, UE, currently connected to the network node, the network node being employed in a wireless communication system.

The network node has the same objects, technical features and advantages as the method therein or performed by the network node. The network node is thus described in brief in order to avoid unnecessary repetition.

Figure 11:
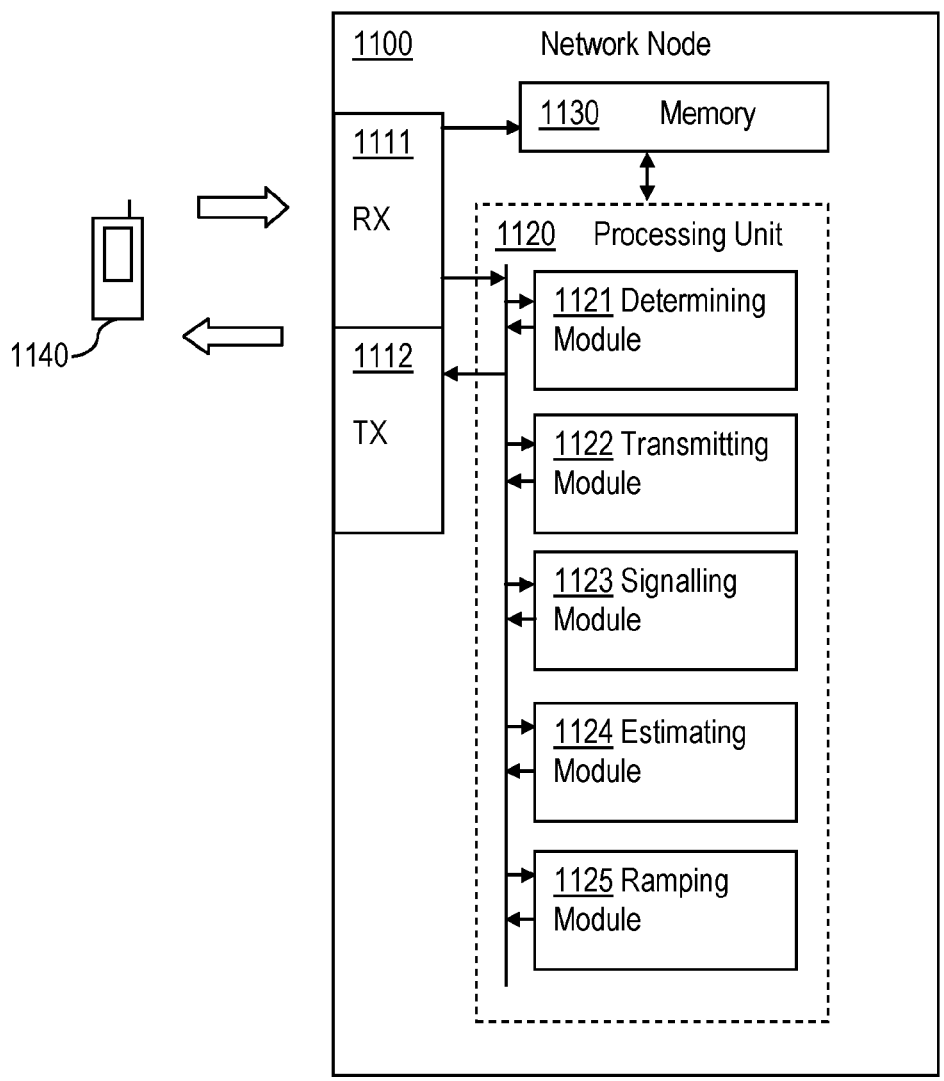
FIG. 11 is a block diagram illustrating a network node for scheduling a downlink data transmission to a UE currently connected to the network node according to an embodiment.

Such a network node will now be described with reference to FIG. 11. FIG. 11 is a block diagram illustrating a network node 1100 for scheduling a downlink data transmission to a UE 1140 currently connected to the network node according to an embodiment.

FIG. 11 illustrates the network node comprising a processing unit 1120 adapted to determine to schedule data transmission to the UE using at least one resource element reserved for transmitting Cell-specific Reference Signals, CRSs, during at least one subframe; and to transmit data to the UE 1140 using the at least one resource element reserved for transmitting the at least one CRS during the at least one subframe.

The network node may have several advantages. By using at least one resource element reserved for transmitting CRS during the at least one subframe for transmitting data, the overhead caused by CRS may be reduced in LTE communication systems of 3GPP release 10 or newer. Another advantage is that the spectral efficiency may be increased. Another advantage is that the impact on UEs supporting only 3GPP release 8 or 9 may be limited.

According to an embodiment, the processing unit 1120 further is adapted to signal to the UE that the at least one resource element, reserved for transmitting the at least one CRS, comprises data intended for the UE during the at least one subframe.

According to another embodiment, the signalling comprises the processing unit 1120 being adapted to set at least one bit in a DCI format directed to the UE, or the signalling comprises RRC signalling.

According to still an embodiment, the processing unit 1120 further is adapted to estimate an impact for UEs anticipating continuous transmission of CRS over the system bandwidth for which suspending of transmission of CRS may degrade performance, connection stability and/or mobility.

According to yet an embodiment, the processing unit 1120 further is adapted to use resource elements, reserved for transmission of CRS, for transmitting data to the UE during at least one subframe, on a portion of the system bandwidth.

According to an embodiment, the network node 1100 is employed in an LTE communication network, wherein the at least one resource element reserved for transmitting the at least one CRS is not comprised in any of the six centre resource blocks of a system bandwidth.

According to another embodiment, the processing unit 1120 further is adapted to determine a predefined number of subcarriers in the centre of a system bandwidth with regards to frequency, and to transmit CRS with decreasing power for subcarriers increasingly distant, with regard to frequency, from the predefined subcarriers in the centre of the system bandwidth.

According to still an embodiment, the processing unit 1120 further is adapted to transmit all resource elements reserved for CRS with a reduced power in the entire subframe.

According to yet an embodiment, the processing unit 1120 further is adapted to ramp the transmission power of CRS up or down between two predetermined transmission power values during at least two subframes.

According to still an embodiment, the processing unit 1120 further is adapted to transmit the CRS at reduced transmit power in a resource block and simultaneously to transmit data to the UE using at least one resource element reserved for transmitting the at least one CRS.

The network node may further comprise a memory capable of storing instructions which when executed by the processing unit 1120 causes the processing unit 1120 to perform the different actions described above. In this manner, the processing unit 1120 is adapted to perform the different actions described above.

Embodiments herein also relate to a UE adapted for receiving downlink data transmission from a network node, the network node being employed in a wireless communication system.

The UE has the same objects, technical features and advantages as the method therein or performed by the UE. The UE is thus described in brief in order to avoid unnecessary repetition.

Figure 12:
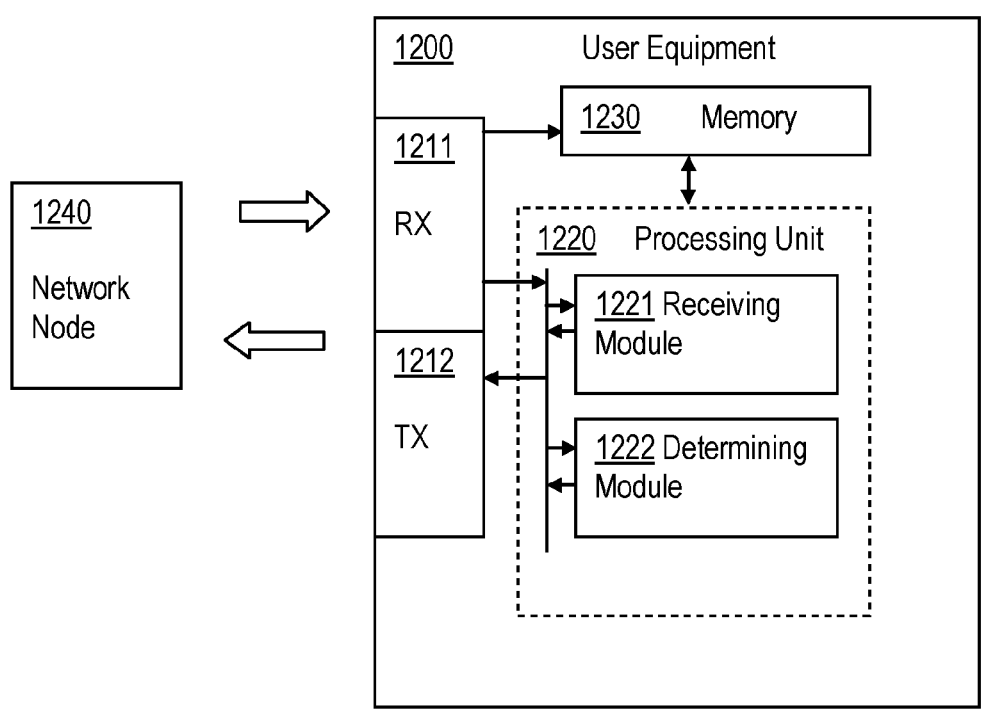
FIG. 12 is a block diagram illustrating a UE for receiving downlink data transmission from a network node according to an embodiment.

Such a UE will now be described with reference to FIG. 12. FIG. 12 is a block diagram illustrating a UE 1200 for receiving downlink data transmission from a network node 1240 according to an embodiment.

FIG. 12 illustrates the UE 1200 comprising a processing unit 1220 adapted to receive a downlink transmission from the network node 1240; and to receive signalling from the network node 1240 indicating that at least one resource element, reserved for transmitting at least one Cell-specific Reference Signal, CRS, comprises data intended for the UE during at least one subframe. The processing unit 1220 further is adapted to determine which resource elements in the received downlink transmission that comprise data based on at least the received signalling.

The UE has corresponding advantages as the network node. This is because the UE and the network node cooperate in the transmission (from the network node) and the reception (by the UE) of the downlink transmission. By using at least one resource element reserved for transmitting CRS during the at least one subframe for transmitting data, the overhead caused by CRS may be reduced in LTE communication systems of 3GPP release 10 or newer. Another advantage is that the spectral efficiency may be increased. Another advantage is that the impact on UEs supporting only 3GPP release 8 or 9 may be limited.

According to an embodiment, the signalling received from the network node 1240 comprises a DCI format directed to the UE wherein one bit is set to indicate that at least one resource element, reserved for transmitting at least one CRS comprises data intended for the UE during at least one subframe, or the signalling comprises RRC signalling.

According to another embodiment, the processing unit 1220 further is adapted to determine which resource elements in the received downlink transmission comprising data based on information comprised in a PDCCH.

The UE may further comprise a memory capable of storing instructions which when executed by the processing unit 1220 causes the processing unit 1220 to perform the different actions described above. In this manner, the processing unit 1220 is adapted to perform the different actions described above.

In FIG. 11, the network node is also illustrated comprising a receiving unit 1111 and a transmitting unit 1112. Through these two units, the network node is adapted to communicate with other nodes and/or entities in the wireless communication network. The receiving unit 1111 may comprise more than one receiving arrangement. For example, the receiving unit may be connected to both a wire and an antenna, by means of which the network node is enabled to communicate with other nodes and/or entities in the wireless communication network. Similarly, the transmitting unit 1112 may comprise more than one transmitting arrangement, which in turn are connected to both a wire and an antenna, by means of which the network node is enabled to communicate with other nodes and/or entities in the wireless communication network. The network node further comprises a memory 1130 for storing data. Further, the network node is illustrated comprising a processing unit 1120 which in turns comprises the different modules 1121-1125. It shall be pointed out that this is merely an illustrative example and the network node may comprise more, less or other units or modules which execute the functions of the network node in the same manner as the units and modules illustrated in FIG. 11.

In FIG. 12, the UE is also illustrated comprising a receiving unit 1211 and a transmitting unit 1212. Through these two units, the UE is adapted to communicate with other nodes and/or entities in the wireless communication network. The receiving unit 1211 may comprise more than one receiving arrangement. For example, the receiving unit may be connected to both a wire and an antenna, by means of which the network node is enabled to communicate with other nodes and/or entities in the wireless communication network. Similarly, the transmitting unit 1212 may comprise more than one transmitting arrangement, which in turn are connected to both a wire and an antenna, by means of which the UE is enabled to communicate with other nodes and/or entities in the wireless communication network. The UE further comprises a memory 1230 for storing data. Further, the UE is illustrated comprising a processing unit 1220 which in turns comprises the different modules 1221 and 1222. It shall be pointed out that this is merely an illustrative example and the UE may comprise more, less or other units or modules which execute the functions of the UE in the same manner as the units and modules illustrated in FIG. 12.

It should be noted that FIGS. 11 and 12 merely illustrates various functional units and modules in the network node and the UE, respectively, in a logical sense. The functions in practice may be implemented using any suitable software and hardware means/circuits etc. Thus, the embodiments are generally not limited to the shown structures of the network node and the UE, respectively, and the functional units and modules. Hence, the previously described exemplary embodiments may be realised in many ways. For example, one embodiment includes a computer-readable medium having instructions stored thereon that are executable by the respective processing units 1120, 1220 for executing the method steps in the network node and the UE, respectively. The instructions executable by the computing system and stored on the computer-readable medium perform the method steps of the network node and the UE, respectively, as set forth in the claims.

FIG. 11 schematically shows an embodiment of a network node 1100. Comprised in the network node 1100 are here a processing unit 1120, e.g. with a DSP (Digital Signal Processor). The processing unit 1120 may be a single unit or a plurality of units to perform different actions of procedures described herein. The network node 1100 may also comprise an input unit for receiving signals from other entities, and an output unit for providing signal(s) to other entities. The input unit and the output unit may be arranged as an integrated entity or as illustrated in the example of FIG. 11, as one or more interfaces 1111, 1112.

Furthermore, the network node 1100 comprises at least one computer program product in the form of a non-volatile memory, e.g. an EEPROM (Electrically Erasable Programmable Read-Only Memory), a flash memory and a hard drive. The computer program product comprises a computer program, which comprises code means, which when executed in the processing unit 1120 in the network node 1100 causes the network node 1100 to perform the actions e.g. of the procedure described earlier in conjunction with FIGS. 8a and 8b.

The computer program may be configured as a computer program code structured in computer program modules. Hence, in an exemplifying embodiment, the code means in the computer program of the network node 1100 comprises a determining module for determining to schedule data transmission to the UE using at least one resource element reserved for transmitting Cell-specific Reference Signals, CRSs, during at least one subframe. The computer program further comprises a transmitting module for transmitting data to the UE using the at least one resource element reserved for transmitting the at least one CRS during the at least one subframe.

Figure 8B:
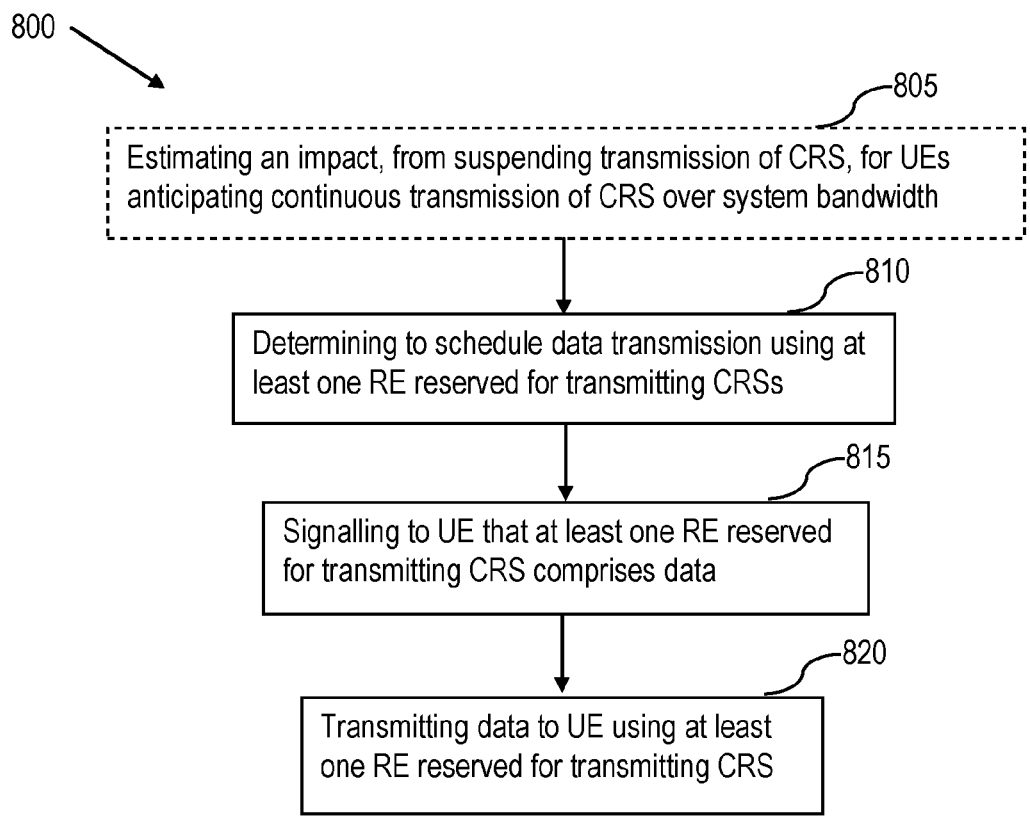

The computer program modules could essentially perform the actions of the flow illustrated in FIGS. 8a and 8b, to emulate the network node 1100.

FIG. 12 schematically shows an embodiment of a UE 1200. Comprised in the UE 1200 are here a processing unit 1220, e.g. with a DSP (Digital Signal Processor). The processing unit 1220 may be a single unit or a plurality of units to perform different actions of procedures described herein. The UE 1200 may also comprise an input unit for receiving signals from other entities, and an output unit for providing signal(s) to other entities. The input unit and the output unit may be arranged as an integrated entity or as illustrated in the example of FIG. 12, as one or more interfaces 1211, 1212.

Furthermore, the UE 1200 comprises at least one computer program product in the form of a non-volatile memory, e.g. an EEPROM (Electrically Erasable Programmable Read-Only Memory), a flash memory and a hard drive. The computer program product comprises a computer program, which comprises code means, which when executed in the processing unit 1220 in the UE 1200 causes the UE 1200 to perform the actions e.g. of the procedure described earlier in conjunction with FIG. 9.

The computer program may be configured as a computer program code structured in computer program modules. Hence, in an exemplifying embodiment, the code means in the computer program of the UE 1200 comprises a receiving module for receiving a downlink transmission from the network node; and for receiving signalling from the network node indicating that at least one resource element, reserved for transmitting at least one CRS comprises data intended for the UE during at least one subframe. The computer program further comprises a determining module for determining which resource elements in the received downlink transmission that comprise data based on at least the received signalling.

The computer program modules could essentially perform the actions of the flow illustrated in FIG. 9, to emulate the UE 1200

Although the code means in the embodiment disclosed above in conjunction with FIGS. 11 and 12 are implemented as computer program modules which when executed in the respective processing unit 1120 and 1220 causes the network node 1100 and the UE 1200 respectively to perform the actions described above in the conjunction with figures mentioned above, at least one of the code means may in alternative embodiments be implemented at least partly as hardware circuits.

The respective processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The respective processor may also comprise board memory for caching purposes. The respective computer program may be carried by a respective computer program product connected to the respective processor. The respective computer program product may comprise a respective computer readable medium on which the computer program is stored. For example, the respective computer program product may be a flash memory, a RAM (Random-access memory) ROM (Read-Only Memory) or an EEPROM, and the respective computer program modules described above could in alternative embodiments be distributed on different computer program products in the form of memories within the network node 1100 and the UE 1200 respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a network node for scheduling a downlink data transmission to a User Equipment (UE) currently connected to the network node, the network node being employed in a wireless communication system, the method comprising:
   determining to schedule data transmission to the UE using at least one resource element reserved for transmitting Cell-specific Reference Signals (CRSs) during at least one subframe;
   signalling to the UE that the at least one resource element, which remains reserved for transmitting the at least one CRS, comprises data intended for the UE during the at least one subframe; and
   transmitting data to the UE using the at least one resource element reserved for transmitting the at least one CRS during the at least one subframe.

2. The method according to claim 1, wherein the signalling comprises one of setting at least one bit in a Downlink Control Information (DCI) format directed to the UE and Radio Resource Control (RRC) signalling.

3. The method according to claim 1, further comprising estimating an impact for UEs anticipating continuous transmission of CRS over the system bandwidth for which suspending of transmission of CRS may at least one of degrade performance, connection stability and mobility.

4. The method according to claim 1, wherein using resource elements, which remains reserved for transmission of CRS, for transmitting data to the UE during at least one subframe, is performed on a portion of the system bandwidth.

5. The method according to claim 1, wherein the network node is employed in a Long Term Evolution (LTE) communication network, wherein the at least one resource element, which remains reserved for transmitting the at least one CRS, is not comprised in any of the six center resource blocks of a system bandwidth.

6. The method according to claim 1, further comprising determining a predefined number of subcarriers in the center of a system bandwidth with regards to frequency, and transmitting CRS with decreasing power for subcarriers increasingly distant, with regard to frequency, from the predefined subcarriers in the center of the system bandwidth.

7. The method according to claim 1, further comprising transmitting all resource elements reserved for CRS with a reduced power in the entire subframe.

8. The method according to claim 1, further comprising ramping the transmission power of CRS one of up and down between two predetermined transmission power values during at least two subframes.

9. The method according to claim 1, further comprising transmitting the CRS at reduced transmit power in a resource block and simultaneously transmitting data to the UE using at least one resource element that remains reserved for transmitting the at least one CRS.

10. A method in a User Equipment (UE) for receiving downlink data transmission from a network node, the network node being employed in a wireless communication system, the method comprising:
    receiving a downlink transmission from the network node;
    receiving signalling from the network node indicating that at least one resource element, which remains reserved for transmitting at least one Cell-specific Reference Signal (CRS), comprises data intended for the UE during at least one subframe; and
    determining which resource elements in the received downlink transmission that comprise data based on at least the received signalling.

11. The method according to claim 10, wherein one of the signalling received from the network node comprises a Downlink Control Information (DCI) format directed to the UE wherein at least one bit is set to indicate that at least one resource element, which remains reserved for transmitting at least one Cell-specific Reference Signal (CRS), comprises data intended for the UE during at least one subframe and Radio Resource Control (RRC) signalling.

12. The method according to claim 10, wherein determining which resource elements in the received downlink transmission comprising data is further based on information comprised in a Physical Downlink Control Channel (PDCCH).

13. A network node configured for scheduling a downlink data transmission to a User Equipment (UE) currently connected to the network node, the network node being employed in a wireless communication system, the network node comprising processing circuitry, the processing circuitry having a memory and a processor that configure the network node to:

determine to schedule data transmission to the UE using at least one resource element reserved for transmitting Cell-specific Reference Signals (CRSs) during at least one subframe;

signal to the UE that the at least one resource element, which remains reserved for transmitting the at least one CRS, comprises data intended for the UE during the at least one subframe; and transmit data to the UE using the at least one resource element reserved for transmitting the at least one CRS during the at least one subframe.

14. The network node according to claim 13, wherein the signalling comprises one of the processing circuitry being further configured to set at least one bit in a Downlink Control Information, DCI, format directed to the UE and Radio Resource Control (RRC) signalling.

15. The network node according to claim 13, wherein the processing circuitry is further configured to estimate an impact for UEs anticipating continuous transmission of CRS over the system bandwidth for which suspending of transmission of CRS may at least one of degrade performance, connection stability and mobility.

16. The network node according to claim 13, wherein the processing circuitry is further configured to use resource elements, which remain reserved for transmission of CRS, for transmitting data to the UE during at least one subframe, on a portion of the system bandwidth.

17. The network node according to claim 13, wherein the network node is employed in a Long Term Evolution (LTE) communication network, wherein the at least one resource element that remains reserved for transmitting the at least one CRS is not comprised in any of the six center resource blocks of a system bandwidth.

18. The network node according to claim 13, wherein the processing circuitry is further configured to determine a predefined number of subcarriers in the center of a system bandwidth with regards to frequency, and to transmit CRS with decreasing power for subcarriers increasingly distant, with regard to frequency, from the predefined subcarriers in the center of the system bandwidth.

19. The network node according to claim 13, wherein the processing circuitry is further configured to transmit all resource elements reserved for CRS with a reduced power in the entire subframe.

20. The network node according to claim 13, wherein the processing circuitry is further configured to ramp the transmission power of CRS one of up and down between two predetermined transmission power values during at least two subframes.

21. The network node according to claim 13, wherein the processing circuitry is further configured to transmit the CRS at reduced transmit power in a resource block and simultaneously to transmit data to the UE using at least one resource element that remains reserved for transmitting the at least one CRS.

22. A User Equipment (UE) configured for receiving downlink data transmission from a network node, the network node being employed in a wireless communication system, the UE comprising a processing circuitry, the processing circuitry having a memory and a processor that configure the UE to:

receive a downlink transmission from the network node;

receive signalling from the network node indicating that at least one resource element, which remains reserved for transmitting at least one Cell-specific Reference Signal (CRS), comprises data intended for the UE during at least one subframe; and determine which resource elements in the received downlink transmission that comprise data based on at least the received signalling.

23. The UE according to claim 22, wherein one of the signalling received from the network node comprises a Downlink Control Information (DCI) format directed to the UE wherein one bit is set to indicate that at least one resource element, which remains reserved for transmitting at least one Cell-specific Reference Signal (CRS), comprises data intended for the UE during at least one subframe and Radio Resource Control (RRC) signalling.

24. The UE according to claim 22, wherein the processing circuitry is further configured to determine which resource elements in the received downlink transmission comprising data based on information comprised in a Physical Downlink Control Channel (PDCCH).

* * * * *